United States Patent
Gupta et al.

(10) Patent No.: US 11,171,487 B2
(45) Date of Patent: Nov. 9, 2021

(54) VOLTAGE CONTROL IN WIND POWER PLANTS

(71) Applicant: VESTAS WIND SYSTEMS A/S, Aarhus N (DK)

(72) Inventors: Manoj Gupta, Singapore (SG); Janakiraman Sivasankaran, Singapore (SG); Leif Svinth Christensen, Thorsø (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/646,207

(22) PCT Filed: Sep. 3, 2018

(86) PCT No.: PCT/DK2018/050217
§ 371 (c)(1),
(2) Date: Mar. 11, 2020

(87) PCT Pub. No.: WO2019/052614
PCT Pub. Date: Mar. 21, 2019

(65) Prior Publication Data
US 2020/0287386 A1     Sep. 10, 2020

(30) Foreign Application Priority Data
Sep. 13, 2017 (PA) .............................. PA201770688

(51) Int. Cl.
*H02J 3/38* (2006.01)
*H02J 3/00* (2006.01)
(Continued)

(52) U.S. Cl.
CPC ............... *H02J 3/381* (2013.01); *F03D 7/02* (2013.01); *H02J 3/001* (2020.01); *H02J 3/16* (2013.01); *H02J 3/46* (2013.01); *H02J 2300/28* (2020.01)

(58) Field of Classification Search
CPC ...................................................... H02J 3/381
(Continued)

(56) References Cited

U.S. PATENT DOCUMENTS

| 7,839,024 B2 * | 11/2010 | Cardinal | F03D 7/0284 |
| | | | 307/84 |
| 8,655,495 B2 * | 2/2014 | Garcia | H02J 3/386 |
| | | | 700/287 |

(Continued)

FOREIGN PATENT DOCUMENTS

| EP | 2800224 A1 | 11/2014 |
| WO | 2019052614 A1 | 3/2019 |

OTHER PUBLICATIONS

Danish Patent and Trademark Office First Technical Examination for Application PA 2017 70688 dated Feb. 15, 2018.
(Continued)

*Primary Examiner* — Adi Amrany
(74) *Attorney, Agent, or Firm* — Patterson + Sheridan, LLP

(57) ABSTRACT

A control system for controlling the power output of a plurality of renewable energy generators, a power network connecting those generators to a Point of Interconnection (PoI) with which the power network is connected to an external power grid, and measurement means configured to measure electrical parameters associated with the Point of Interconnection, wherein the control system is configured to: operate each renewable energy generator to achieve a respective current level at a terminal of the generator that is equal to a current set point; implement, during a grid fault
(Continued)

event, a feedback control routine in which the control system: determines a measured value of an electrical parameter at the Point of Interconnection, determines a target value of the electrical parameter; and modifies the current set point based on the measured value and the target value of the electrical parameter.

11 Claims, 8 Drawing Sheets

(51) Int. Cl.
　　　*F03D 7/02*　　(2006.01)
　　　*H02J 3/16*　　(2006.01)
　　　*H02J 3/46*　　(2006.01)
(58) Field of Classification Search
　　　USPC .......................................................... 307/84
　　　See application file for complete search history.

(56) References Cited

U.S. PATENT DOCUMENTS

| | | | |
|---|---|---|---|
| 2009/0218817 A1* | 9/2009 | Cardinal | F03D 7/048 290/44 |
| 2010/0094474 A1* | 4/2010 | Larsen | H02J 3/16 700/287 |
| 2010/0268393 A1 | 10/2010 | Fischle et al. | |
| 2010/0312410 A1* | 12/2010 | Nielsen | F03D 7/047 700/287 |
| 2011/0006528 A1* | 1/2011 | Engelhardt | H02J 3/381 290/44 |
| 2012/0150524 A1* | 6/2012 | Nielsen | H02J 3/381 703/18 |
| 2013/0241201 A1* | 9/2013 | Fortmann | H02J 3/386 290/44 |
| 2015/0137520 A1* | 5/2015 | Garcia | F03D 7/0284 290/44 |
| 2015/0148974 A1 | 5/2015 | Diedrichs | |
| 2016/0134121 A1 | 5/2016 | Bartsch | |
| 2016/0245259 A1* | 8/2016 | Gupta | H02J 3/381 |
| 2016/0322821 A1 | 11/2016 | Saboor et al. | |
| 2016/0336888 A1* | 11/2016 | Busker | H02J 3/24 |

OTHER PUBLICATIONS

PCT Written Opinon of the International Searching Authority for Application No. PCT/DK2018/050217 dated Feb. 15, 2018.
European Patent Office Examination Report for Application No. 18 766 124.4-1202 dated Apr. 14, 2021.

* cited by examiner

VOLTAGE CONTROL IN WIND POWER PLANTS

TECHNICAL FIELD

The present invention relates to a method of controlling a renewable energy power plant, a renewable energy power plant controller, and to a wind turbine power plant and to renewable energy power plants more generally.

BACKGROUND

Newly commissioned renewable power plants, and more particularly wind power plants, are expected to be able to operate and adapt to a number of different circumstances when connected to a power network. A wind power plant typically comprises a plurality of wind turbine generators and is also known as a wind park or a wind farm. The regulation and general operation of the power plant is controlled by a power plant control system or controller (PPC), which implements operational limits and requirements as set out by a Transmission System Operator (TSO) or in country-specific grid interconnection requirements or 'grid codes'. The TSO also communicates power delivery demands to the PPC, including reactive current delivery demands.

Grid codes commonly include specific requirements for reactive and/or active current supply during a fault. These requirements ensure that the network is fully supported throughout the fault and that voltage level recovery is sustained by the active and/or reactive current supplied by the wind power plant or plants.

Recently, due to an increase in the number of wind power plants connected to national grids, grid code requirements have specified current supply levels at a Point of Interconnection (PoI) between the grid and the power plant. Previously, current supply levels were specified at each terminal of the individual wind turbine generators in a power plant. This allows for distributed current generation and flexibility in how the current is supplied to the grid by the power plant. However, it also often results in grid code requirements not being met during faults. The reason for this is due to the wind turbine generators continuing to act as autonomous current sources that are de-coupled from the control of the PPC during the fault, despite the requirements being specified for the PoI.

It is an aim of the present invention to overcome this problem.

SUMMARY OF THE INVENTION

According to an aspect of the invention, there is provided a renewable energy power plant comprising a plurality of renewable energy generators and a control system for controlling the power output of the plurality of renewable energy generators, a power network connecting those renewable energy generators to a Point of Interconnection (PoI) with which the power network is connected to an external power grid, and measurement means configured to measure electrical parameters associated with the Point of Interconnection, wherein the control system is configured to; operate each renewable energy generator to achieve a respective current level at a terminal of the generator that is equal to a current set point; implement, during a grid fault event, a feedback control routine in which the control system: determines a measured value of an electrical parameter at the Point of Interconnection, and determines a target value of the electrical parameter; modifies the current set point based on the measured value and the target value of the electrical parameter.

Incorporating a control system as described above allows a set point to be achieved through feedback alone, without a reliance on look-up tables, complex calculations, complex modelling or predetermined values. The control system is particularly useful as it matches the output level of the renewable energy generators to a target value at the PoI, where there may not be a direct correlation between these values. Thus, a target value can be achieved at the PoI quickly and without complex calculations during a grid fault.

An additional benefit is that the renewable power plant can comply with specific requirements set out for grid faults by a grid code or other regulatory system. By complying with grid code requirements, the power plant is less likely to be disconnected from the grid during the fault.

During the grid fault event, the control system may operate each renewable energy generator to achieve a respective current level at a terminal of the generator that is equal to the modified current set point.

During the grid fault, the control system may determine whether the measured value of the electrical parameter is substantially equal to the target value of the electrical parameter.

If it is determined that the measured value of the electrical parameter is not substantially equal to the target value of the electrical parameter, the control system may repeat the feedback control routine.

The control system may repeat the feedback control routine until the measured value of the electrical parameter is equal to the target value of the electrical parameter.

Advantageously, comparing the measured and target values of the electrical parameter allow for a continued iteration of the method until the set point yields a measured value that is sufficiently similar to the target. This ensures that grid code requirements are complied with.

The control system may comprise a plurality of renewable energy generator controllers. Each one of the renewable energy generator controllers may be associated with a respective renewable energy generator or group of renewable energy generators. A plurality of renewable energy generator controllers allows the functionality required to be distributed, resulting in faster processing for each individual generator of the plurality.

Each one of the renewable energy generator controllers may be configured to modify the current set point for its respective renewable energy generator or generators.

During a grid fault event, the control system may calculate a correction factor. The control system may modify the current set point using the correction factor.

The calculation of the correction factor may comprise the calculation of a ratio between the measured value and the target value of the electrical parameter. Using a ratio ensures that the error is quantified and used to implement the feedback control.

During a grid fault event, the control system may modify the current set point based on a directional component and the calculated correction factor. The directional component may indicate the direction in which the correction factor should be applied.

The electrical parameter may be active current output level. The electrical parameter may be reactive current output level. Advantageously, the invention may therefore be used to calculate active current and reactive current set points at the generators so as to achieve active current output level and reactive current output level at the PoI respectively. This is particularly useful during a grid fault, where grid codes specify target levels for both active current output and reactive current output at the PoI, but not at the generators.

During a grid fault, the control system may determine a voltage level of the grid. The control system may determine a target value of the electrical parameter based on the determined voltage level.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
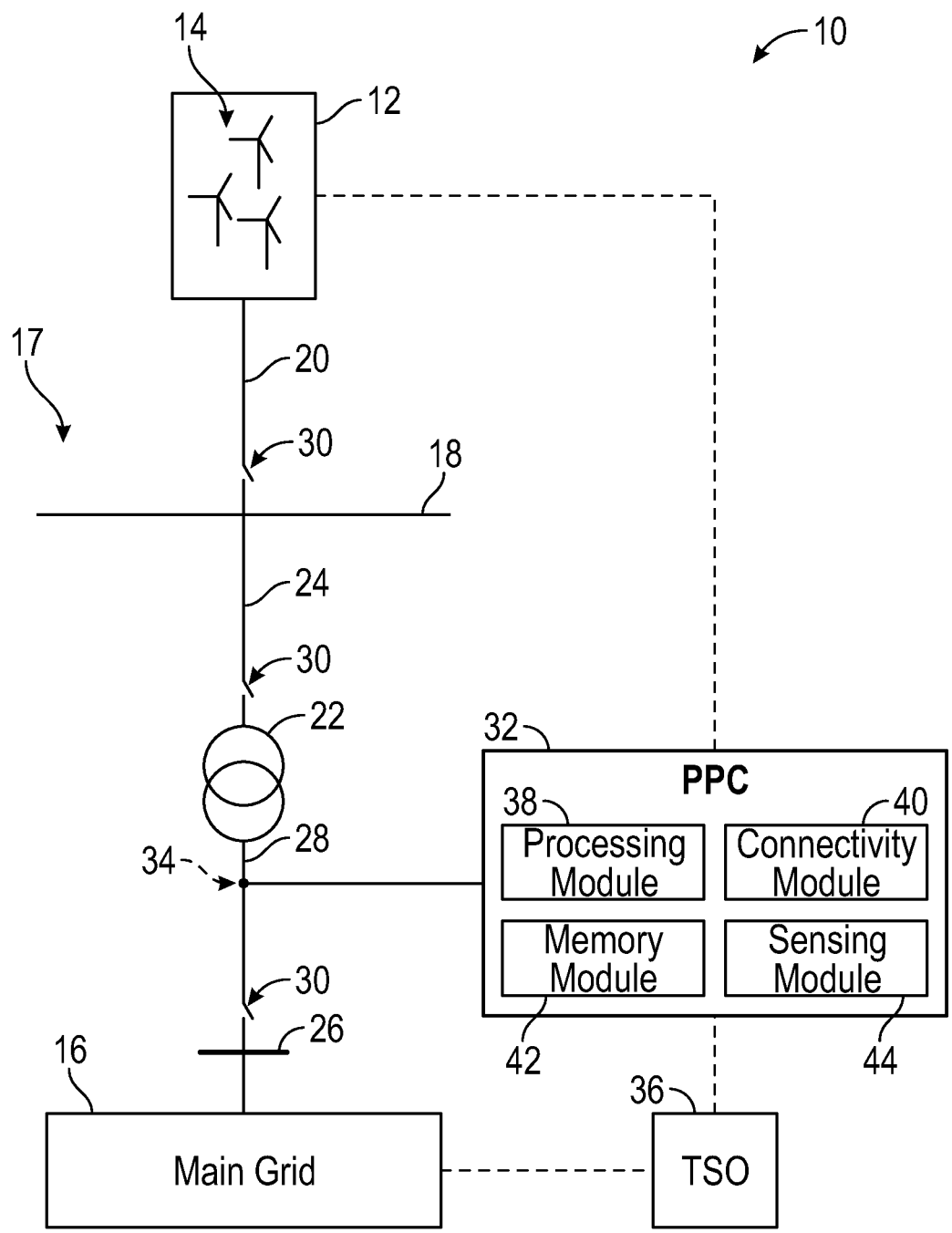
FIG. 1 is a schematic view of a power network including a wind power plant and a main grid according to an embodiment of the invention.

FIG. 1 illustrates a typical architecture in which a wind power plant (WPP) is connected to a main transmission grid as part of a wider power network. The example shown is representative only and the skilled reader will appreciate other specific architectures are possible, in relation to both wind power plants and power plants for other renewable energy sources. In addition, the skilled reader will appreciate that methods, systems and techniques also described below may be applicable to many different configurations of power network. Moreover, the components of the wind power plant and power network are conventional and as such would be familiar to the skilled reader.

FIG. 1 shows a power network 10 incorporating a wind power plant (WPP) 12 including a plurality of wind turbine generators 14 (WTGs) often more commonly called 'wind turbines'. A single wind turbine would also be possible. Each of the plurality of WTGs 14 converts wind energy into electrical energy, which is transferred from the WTGs 14 to a main transmission power network 16 or main grid, as active current, for distribution. A collector network 17 extends between the WPP 12 and the main grid 16.

WTGs 14 generate both active current and reactive current. The main grid 16 often has specific active and reactive current requirements with which the WPP 12 is required to comply, and the output of the WTGs 14 can be changed to match these requirements in real time. In particular, grid requirements specify current levels required to support voltage levels of the main grid 16 during a grid fault, and the output of WTGs 14 can be manipulated to meet these. The method and system described herein according to embodiments of the invention act to ensure that the output of the WTGs 14, and hence the WPP 12, is sufficient to overcome impedances in the system 10 between the grid 16 and the WTGs 14 and to supply a required and correct amount of current as necessary. The method and system implement a closed feedback system that may be applied to any renewable energy power plant or network without a requirement for highly specific calculations of the actual impedances present. The methods and systems are described herein deliver a precise amount of reactive or active current swiftly.

Returning to FIG. 1, each of the WTGs 14 of the WPP 12 is connected to a local grid (not shown) that links the WTGs 14. The WPP 12 is, in turn, suitably connected to a collector bus 18 via a feeder line 20. The collector bus 18 may be at an intermediate voltage level that is suitable for relatively short distance power transmission, for example in the region of 10 kV to 150 kV, most usually between 110 kV and 150 kV. The collector bus 18 may also provide a point of common coupling (PCC) for a plurality of wind power plants, although, only a single WPP 12 is shown here for simplicity.

The collector bus 18 is connected to a main step-up transformer 22 by a transmission line 24. The main transformer 22 is in turn connected to the main grid 16 at a Point of Interconnection (PoI) 26 by another transmission line 28. The PoI 26 is an interface between the WPP 12 and the main grid 16.

While the collector bus 18 may be required to span distances up to around 100 km, the main grid 16 may be an international, national, or regional grid such as the National Grid of Great Britain, for example, and therefore may be required to span distances of up to around 250 km or more. Accordingly, the voltage level of the main grid 16 may be much higher than the voltage level of the collector bus 18 for better transmission efficiency.

The connecting lines such as the transmission and feeder lines 20, 24, 28 may each include a protection system 30 to protect individual components from damage during or following extreme conditions. For example, it is envisaged that at least an appropriate circuit breaker will be included in each line.

Hereinafter, it should be assumed that references to components being connected or connections between components comprise suitable feeder or transmission lines as described above unless it is otherwise indicated.

A Power Plant Controller (PPC) 32 is connected to the power network 10 at a Point of Measurement (PoM) 34 and is also connected directly to the WPP 12. The role of the PPC 32 is to act as a command and control interface between the WPP 12 and a grid operator or transmission system operator (TSO) 36. The TSO 36 is responsible for indicating the needs and requirements of the main grid 16 to the PPC 32. The PPC 32, in its role as command and control interface, interprets the power delivery demands requested of it by the TSO 36 and manages the wind turbines 14 in the WPP 12 in order to satisfy those requirements, whilst taking into account other operative factors such as grid faults and sudden changes in output or measured grid voltage.

The PPC 32 is a suitable computer system for carrying out the controls and commands as described above and so incorporates a processing module 38, a connectivity module 40, a memory module 42 and a sensing module 44.

In order to monitor and regulate the output of the WPP 12 and to interpret the power demands correctly, the PPC 32 is connected to the transmission line 28 between the main transformer 22 and the PoI 26 at the PoM 34. The PPC 32 is equipped to measure a variety of parameters including a representative power output that will be supplied to the main grid 16 at the PoI 26 by the WPP 12. As the PoM 34 is not at the PoI 26, the measured parameters are only representative as losses in the lines between the PoM 34 and PoI 26, and between the PoM 34 and the PPC 32, may have an effect on the measurements. Suitable compensation may take place to account for the losses to ensure that the measurements are accurate.

In addition, the PPC 32 measures parameters of the power output such as a frequency and voltage, as well as reactive current exchange between the WPP 12 and the main grid 16 and the voltage level of the main grid 16. The PPC 32 compares the measured parameters against specific grid requirements and communicates control commands to specific components of the WPP 12 accordingly. The WPP 12 is capable of altering its reactive current output in reaction to commands received from the PPC 32.

The PPC 32 communicates control commands to the turbines 14 in a suitable manner. It will be noted that FIG. 1 is a schematic view, so the way in which the control commands are transferred to the turbines 14 is not depicted explicitly. However, it will be appreciated that suitable cabling may be provided to interconnect the PPC 32 and the turbines 14. The interconnections may be direct or 'point to point' connections, or may be part of a local area network (LAN) operated under a suitable protocol (CAN-bus or Ethernet for example). Also, it should be appreciated that rather than using cabling, the control commands may be transmitted wirelessly over a suitable wireless network, for example operating under WiFi™ or ZigBee™ standards (IEEE802.11 and 802.15.4 respectively).

The diagram of FIG. 1 should only be taken as a representation of a power network. Alternative configurations of power network and power plants are known and it is expected that other known components may be incorporated in addition to or as alternatives to the components shown and described in FIG. 1. Such changes would be within the capabilities of the skilled person. For example, substations or extra transformers would be expected to be incorporated in the wind power plant depending upon the number of turbines included in the plurality of wind turbines.

In some embodiments, the PoM 34 may be positioned at a different position in the system such that the parameters measured by the PPC 32 are not representative of the actual values for those parameters at the PoI 26 and the values may differ. In this case, a correction factor may be applied to the measurements to adjust for the different position of the PoM 34 relative to the PoI 26. It therefore does not matter where the PoM 34 is located with regard to the PoI 26, so long as there is a predetermined correction factor. Therefore, the measured voltage may be indicative of, or associated with, the voltage at the point of interconnection, even if the voltage is not measured directly at that location.

For the purposes of the present application, it is assumed that the PoM 34 is at same location as the PoI 26, and subsequent references to measurements will only be made with reference to the PoI 26. It will be appreciated, as discussed above, that the PoM 34 may be positioned at a different position and the difference in magnitude of each measurement due to this different position may be accounted for with a correction factor without affecting the operation of the system.

As described above, the WPP 12 must comply with a set of grid requirements specific to the main grid 16. In particular, the operation of the PPC 40 and WPP 12 in reaction to a grid fault is especially important and requires careful control of voltage and power outputs to fulfil grid requirements and to support the grid 16 to enable an efficient recovery to normal operating levels.

As will be understood by the skilled person, a grid fault is generally defined as a period in which the voltage level of the grid 16 or wider power network drops to a level outside the accepted and normal operational bounds. During a grid fault, the WPP 12 in a low-voltage ride through (LVRT) mode to avoid disconnection of the WPP 12 from the grid 16 and to support the grid 16 through the fault. If the WPP 12 is disconnected from the grid 16, it will be more difficult for the grid 16 to recover from the fault due to the loss of voltage generation that it received from the WPP 12. In the LVRT mode, the WPP 12 supports the grid 16 during the fault by supplying reactive current to encourage a rise in voltage levels. The WPP 12 is required to supply reactive current until the voltage levels have returned to levels that are within a normal operating band. In many circumstances, this operating band is between voltage levels of 0.9 pu to 1.1 pu.

In LVRT mode, the WTGs 14 of the WPP 12 act autonomously, controlled by WTG controllers (not shown), and are not controlled by the PPC 32. The WTGs 14 control their active and reactive current outputs based on the voltages across their individual terminals, and based upon grid requirements. However, the grid requirements for active and reactive current are specified at the PoI 26, and not for individual WTGs 14, so a difference exists between the measured active or reactive current output across the WTG terminal and the measured output at the PoI 26 due to impedance of the collector network 17 between the terminal and the PoI 26.

Figure 2:
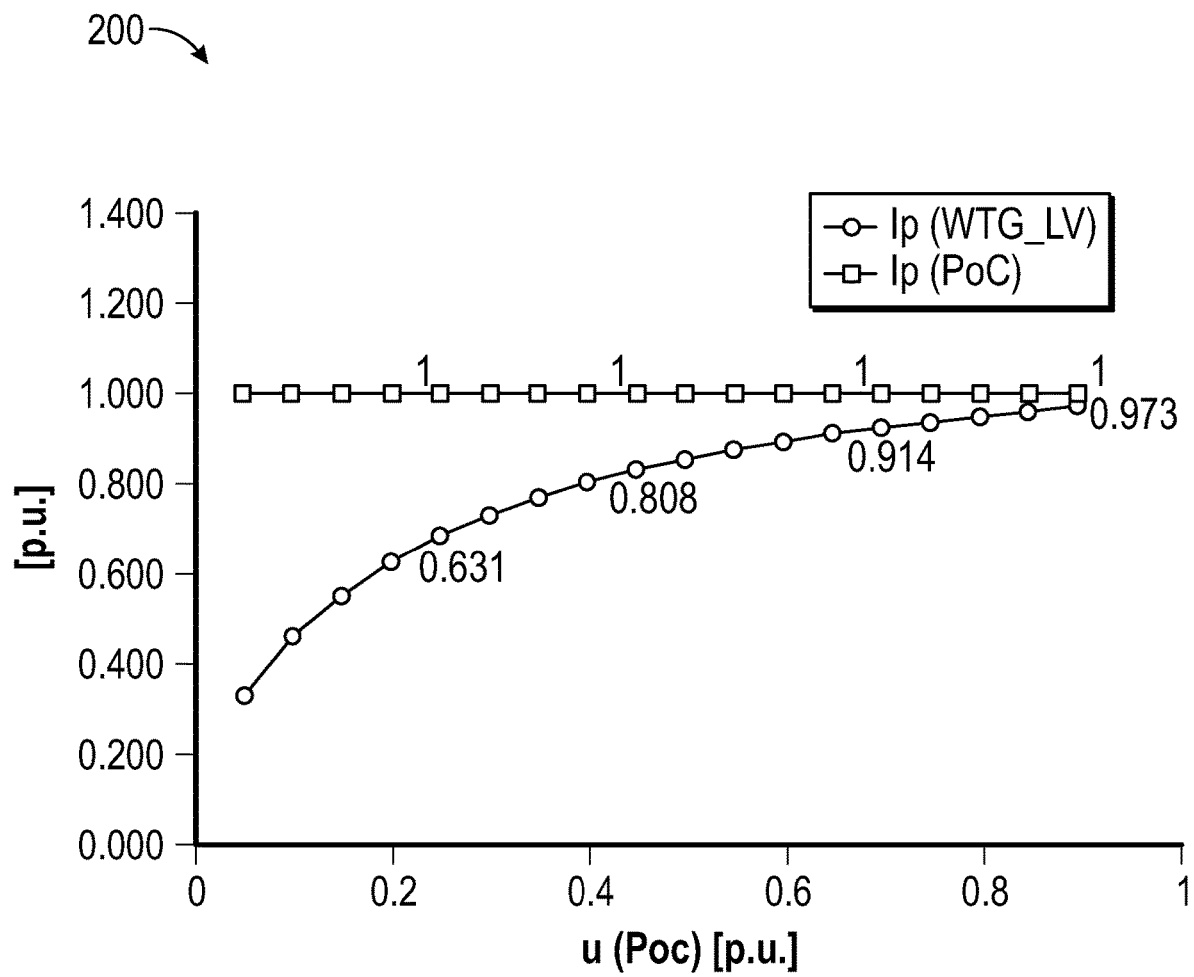
FIG. 2 is a chart outlining active current as a function of voltage when measured at the Point of Interconnection and when measured at the terminal of a wind turbine generator.
Figure 3:
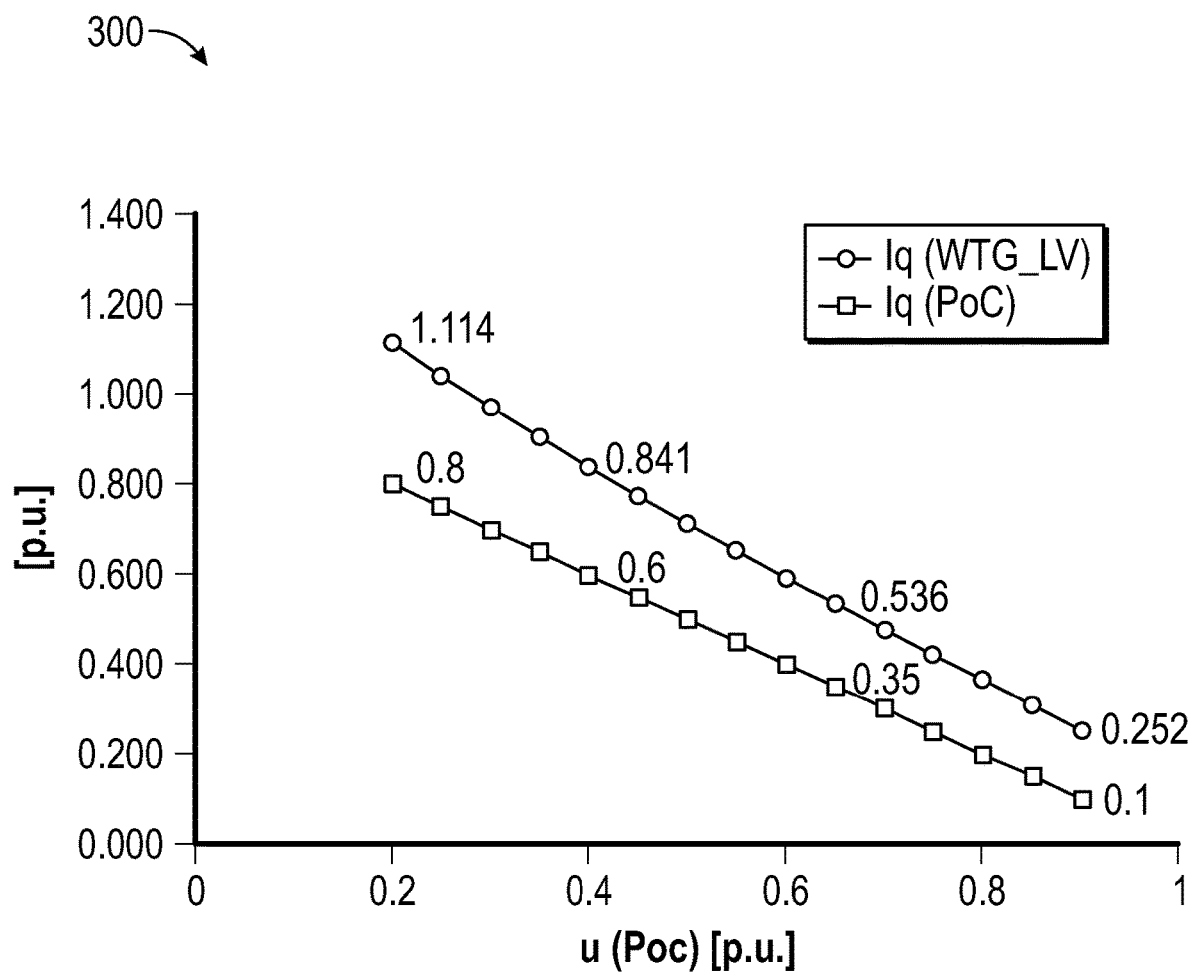
FIG. 3 is a chart outlining reactive current as a function of voltage when measured at the Point of Interconnection and when measured at the terminal of a wind turbine generator.

Examples of this are shown in the charts 200, 300 of FIGS. 2 and 3 for active current and reactive current respectively. Each chart 200, 300 shows the grid requirement along with a typical corresponding WTG 14 output that is required to achieve the grid requirement.

In other words, in FIG. 2, it can be seen that the grid requirement for active current output at the PoI 26 is 1 per unit (p.u) active current at all voltage levels between 0.05 p.u, and 0.9 p.u. To achieve these active current output levels at the PoI 26, the WTG 14 must produce a varying amount of active current that increases with increasing voltage. So, if the measured voltage is 0.4 p.u., the grid requirement active current level is 1 p.u., and to achieve this level, the output active current from the WTG 14 must be 0.808 p.u.

As would be understood by the skilled person, per-unit voltage is an expression of the voltage with respect to a base value which is used as a reference. Using a per-unit system allows for normalization of values across transformers and other components that may change the value by an order of magnitude.

Similarly, FIG. 3 illustrates that the grid requirements for reactive current output level at the PoI 26 is a linear relationship between 0.8 p.u. reactive current at 0.2 p.u. voltage and 0.1 p.0 reactive current at 0.9 p.u. voltage. The corresponding WTG requirement extends between 1.114 p.u. and 0.252 p.u. So, for a measured voltage level of 0.4 p.u, the reactive current level required by the grid requirements is 0.6 p.u., and the WTG 14 must supply 0.841 p.u. reactive current.

It will be appreciated, however, that the WTG output levels illustrated in FIGS. 2 and 3 are for example only, and in reality, collector networks 17 between the PoI 26 and the WTG terminals for different systems may vary highly depending upon the type of components incorporated into the network, the interconnection type between the grid 16 and the WPP 12, the quality of the components incorporated, the quality of the power incorporated, the age of the network, and the grid type.

To achieve the correct levels at the PoI 26 according to the grid code, conventional practice is to simulate the operation of the WPP 12 and collector network 17, and to use these simulations to specify WTG output levels. In some practices, it is also conventional to validate these simulations with on-site measurements. This results in a particularly costly and difficult process that is not guaranteed to give the required accuracy. In some instances, the calculated WTG output levels may be wrong if a small change is made to the collector network 17.

If the WTG output levels calculated for meeting the grid requirement levels are incorrect, the output at the PoI 26 may fall short of the levels specified by the grid requirements, and so the WPP 12 may not support the grid 16 satisfactorily during the fault. This may result in disconnection of the WPP 12.

To ensure that in LVRT mode the WTGs 14 operate to support the grid 16 sufficiently, a control method according to the invention may be implemented, in which reactive and active current levels at the PoI 26 are in a closed feedback loop to iteratively align the PoI output levels and the WTG output levels.

Figure 4:
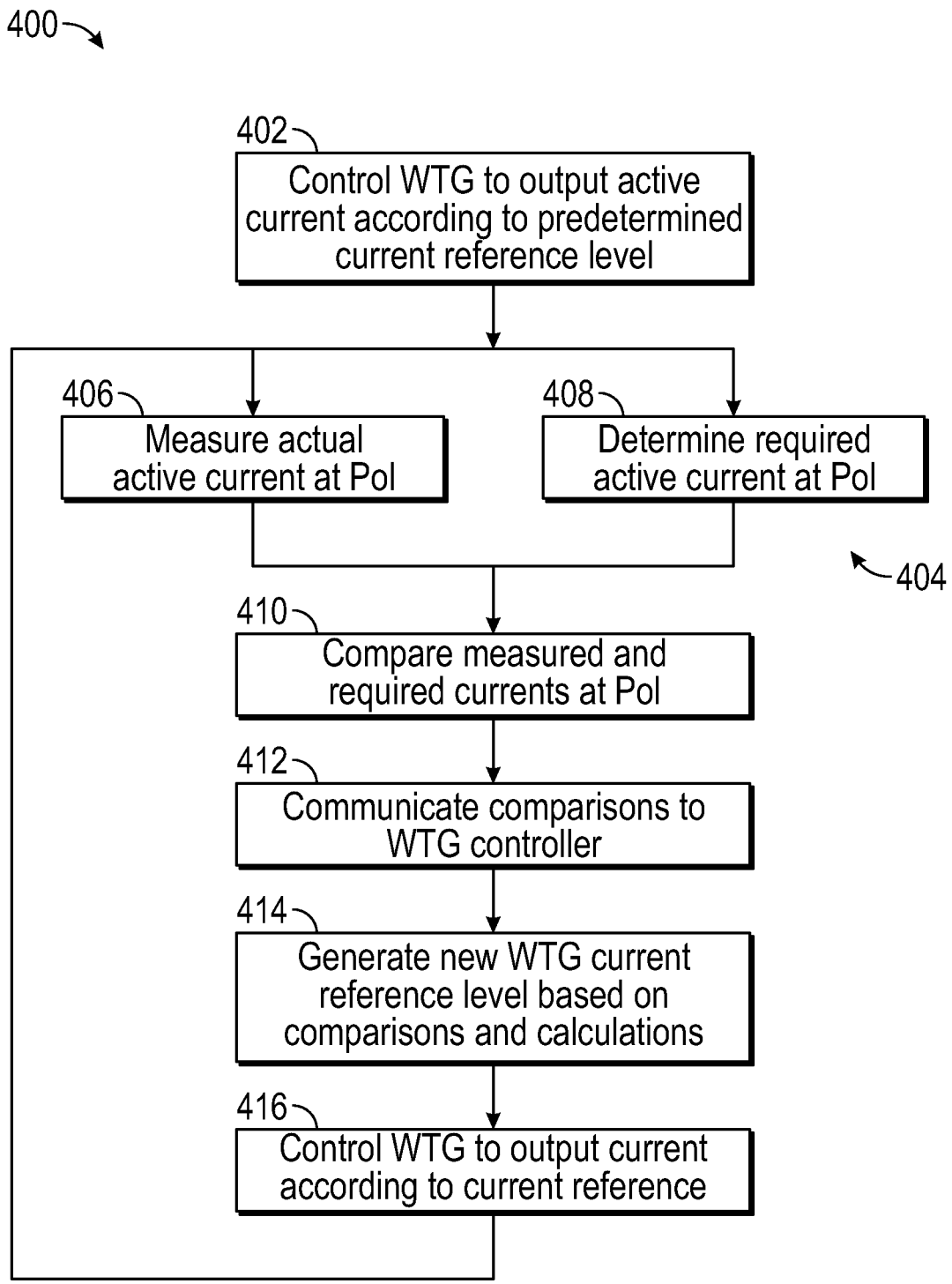
FIG. 4 is a flow chart illustrating a process governing the operation of a wind turbine generator according to an embodiment of the invention.

FIG. 4 shows a flow chart illustrating a control method 400 according to the invention governing automatic feedback of active or reactive current output levels at the PoI 26 to an individual WTG 14 to tailor the WTG output to ensure grid requirements are met at the PoI 26. The method 400 is applicable to both reactive current feedback and active current feedback, and is the same for each, although for clarity the flow chart shown in FIG. 4 will only be described in relation to active current.

Initially, having entered the LVRT mode, the WTG 14 is controlled 402 by a WTG controller (not shown) to output active current according to a predetermined current set point. The predetermined current set point may be a nominal value such as 0.5 p.u, for all voltage levels. Furthermore, the set point may be particular to each generator, or may initially be a universal reference level at which all generators operate having entered LVRT mode. It will be appreciated that the set points of the generators will subsequently differ, as will be explained below. As used here, the term set point has its ordinary meaning of a 'process' or 'target' variable/value with reference to which a system is controlled by a suitable control algorithm to meet that target value.

In the step 404 following control 402 of the WTG 14 to output the active current, the actual active current and the required active current are identified. The step of identifying the actual active current comprises measuring 406 the actual active current level at the PoI 26 due to controlling the WTG 14 to output active current at the predetermined current set point. Identifying the required active current comprises determining 408 the active current level specified by the grid requirements that corresponds to a particular voltage level at the PoI 26. It is envisaged that to determine 408 required active current, the voltage at the PoI 26 would first be measured, and then being compared with a look-up table to establish the correct required active current level. These steps of measuring 406 the active current at the PoI 26 and determining 408 the required active current at the PoI 26 are shown in FIG. 4 as being performed simultaneously, although it will be appreciated that they may be performed in any order.

Following the measurement of actual active current and determination of required active current at the PoI 26, the actual and required currents are compared 410 by a comparator (not shown) at the PoI 26. The comparison seeks to identify deviation of the actual current level from the required current level and to quantify the change in both the current set point and the output of the WTG 14 required to meet the required current level as specified by the grid requirements.

Subsequently, the comparison of the actual and required current is communicated 412 to the WTG controller, which then generates 414 a new current set point for the next iteration of the method based on the comparisons performed by the comparator and also based on calculations performed either by the comparator or by the WTG controller. The new current set point replaces the previous current set point. It will be appreciated that current set points are here generated per WTG 14, so that current set points may not be similar between WTGs 14.

The WTG 14 is then controlled 416 by the WTG controller to output active current according to the generated new current set point, and the process returns to the steps 404 of measuring 406 actual active current and determining 408 required active current at the PoI 26 to further refine the current set point so that grid requirements are met during the fault.

Figure 5:
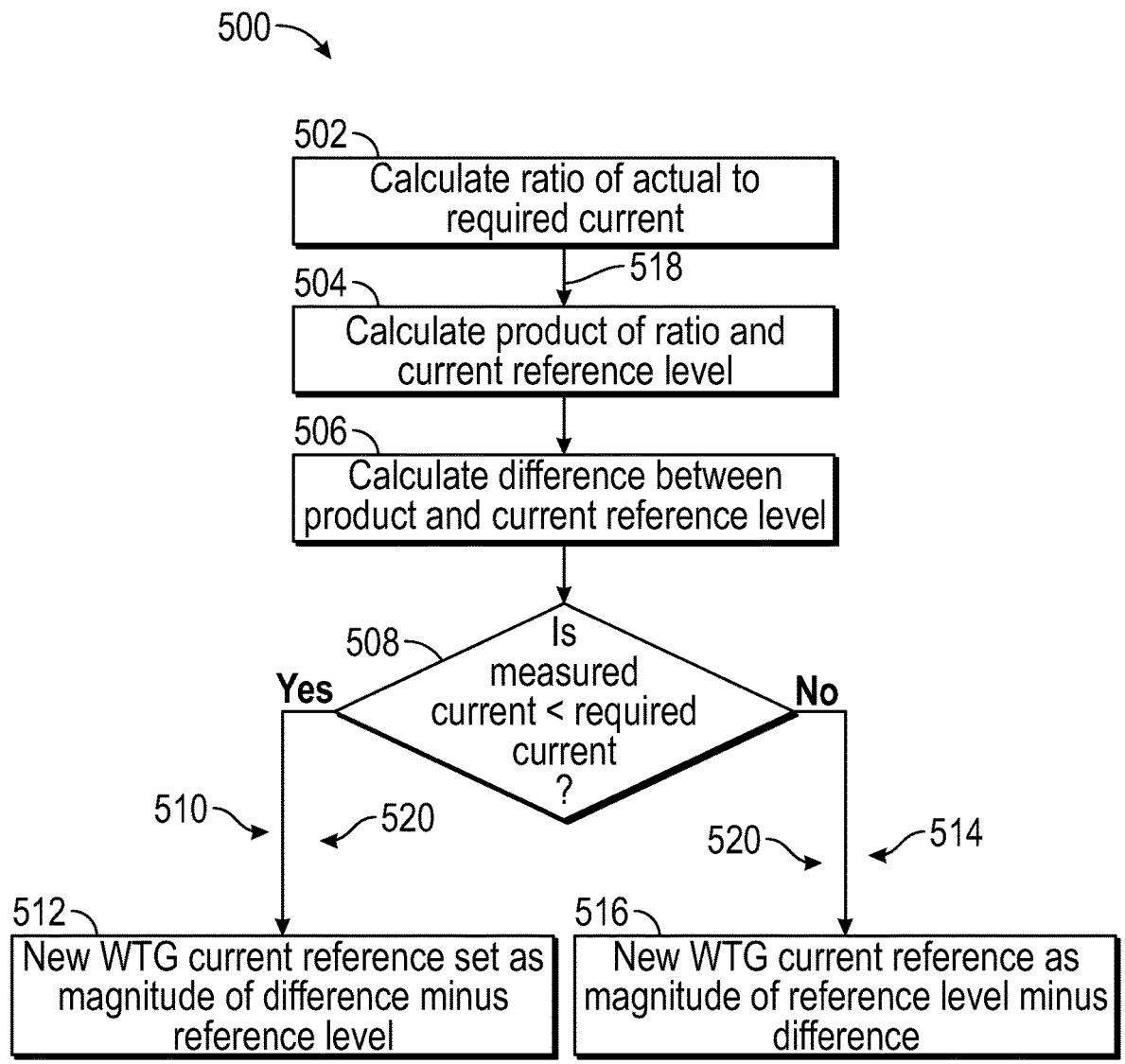
FIG. 5 is a flow chart illustrating a series of calculations performed during the process of FIG. 4.

Now considering the steps of the method 400 of FIG. 4 in more detail, FIG. 5 shows a flow chart 500 illustrating a series of comparisons and calculations that may be undertaken by the comparator and WTG controller to generate new WTG current set points. The flow chart 500 of FIG. 5 corresponds to steps 410 and 414 of the method 400 of FIG. 4. It is assumed that the actual and required active current levels have already been identified 404 by the comparator.

At the first step 502 of the calculation process of FIG. 5, the active current level, $I_{actual}$, and required current level, $I_{required}$, are compared to calculate a ratio, r, of the actual current level to the required current level, such that $r = I_{actual}/I_{required}$.

It will be appreciated that the difference between the active current level and the required current level is the error present at the PoI 26 and that this cannot be used to directly correct the wind turbine current set point as the two values are not proportionally linked. Thus, a ratio is calculated to provide a weighting to the current iteration of the set point.

Having calculated the ratio of actual current level to the required current level, the process 500 then calculates 504 the product, p, of the ratio, r, and the set point for the current iteration of the method that the WTGs 14 are being controlled to supply, $I_n$. Thus, $p = rI_n$.

As demonstrated, the ratio therefore provides a weighting value for weighting the current set point relative to the error between the actual and required current levels. A ratio that is close to 1 indicates that the error is small, and so the current set point weighting is small as only a small amount of correction is required to bring the current set point in line with the desired value. Conversely, a ratio close to 0 indicates a need for a large weighting to effect a greater change in the magnitude of the set point.

The difference, d, between the product, p, and the current set point, $I_n$, is then calculated 506, such that $d=p-I_n$.

By calculating the product of the set point and the ratio and then finding the difference between the product and the current set point, an actual magnitude for correction of the set point can be obtained.

At the next step 508, a comparison between the measured current and required current is used to determine the new current set point. This step 508 determines the direction in which the correction calculated at step 506 is to be applied, and so may be considered to constitute a directional component.

If the measured current is less 510 than the required current, then the previous current set point is superseded 512 by a new current set point, $I_{n+1}$, for use in the next iteration of the method. The new set point is calculated as being the magnitude of the difference between the difference, d, and the current set point, $I_n$, of the previous iteration of the method of FIG. 4. So, new set point $I_{n+1}=|d-I_n|$ in this case.

If the measured current is greater 514 than the required current, then the previous current set point is overwritten 516 with a new current set point, $I_{n+1}$, that is calculated as being the magnitude of the difference between the previous current set point, $I_n$ and the difference, d. So, new set point $I_{n+1}=|d-I_n|$ in this case.

This could therefore be written as follows:

$$I_{n+1} = \begin{cases} |d - I_n|, & I_{actual} < I_{required} \\ |I_n - d|, & I_{actual} > I_{required} \end{cases}$$

where $d=r(I_n-1)$, $p=rI_n$, $r=I_{actual}/I_{required}$, and $I_n$ is the reference set point from which the measured value of $I_{actual}$ resulted.

As per FIG. 4, the WTGs 14 are then controlled 416 to output active current according to the new current set point, $I_{n+1}$. The calculations are then performed again. with $I_n$ being set as $I_{n+1}$ and a new current set point, $I_{n+1}$, being generated 414.

It is envisaged that the process 500 of FIG. 5 may incorporate a step to check if the measured current and required current are equal. If this is the case, the WTG 14 will continue to be controlled 416 to output active current according to the latest current set point until the voltage level changes or a difference between the measure current and required current occurs.

To summarise, the method 400 performs a series of calculation steps 502, 504, 506, 508 having initially determined 406, 408 measured values and target values of a desired electrical parameter such as active current output or reactive current output to the grid 16. The calculation steps 502, 504, 506, 508 are also considered to be comparison 410 and generation 414 steps of a current set point. When considered in another way, the calculation steps 502, 504, 506, 508 may be considered to be implemented to indirectly calculate the error, the amount by which the measured value is required to change to reach the target value, the biasing value needed to change the output of the each WTG 14 and the direction in which the change is needed. In general, these steps 502, 504, 506, 508 can be considered as a single step to be the calculation of a correction factor. It will be appreciated that this correction factor is not merely a calculation of error by basic subtraction, as the measured and target values do not necessarily correspond to the outputs from each WTG 14.

The steps of the method 500 of FIG. 5 may be calculated at either the WTG controller or at the PoI 26. In an embodiment, the calculation 502 of the ratio, and the comparison 508 of measured current and required current to determine if measured current is greater than or less than required current are performed at the comparator at the PoI 26. The results 518, 520 of these steps 502, 508 are passed to the WTG controller, and the steps of calculating 504, 506, 512, 516 the product, difference and new current set point are performed by the WTG controller.

Figure 6:
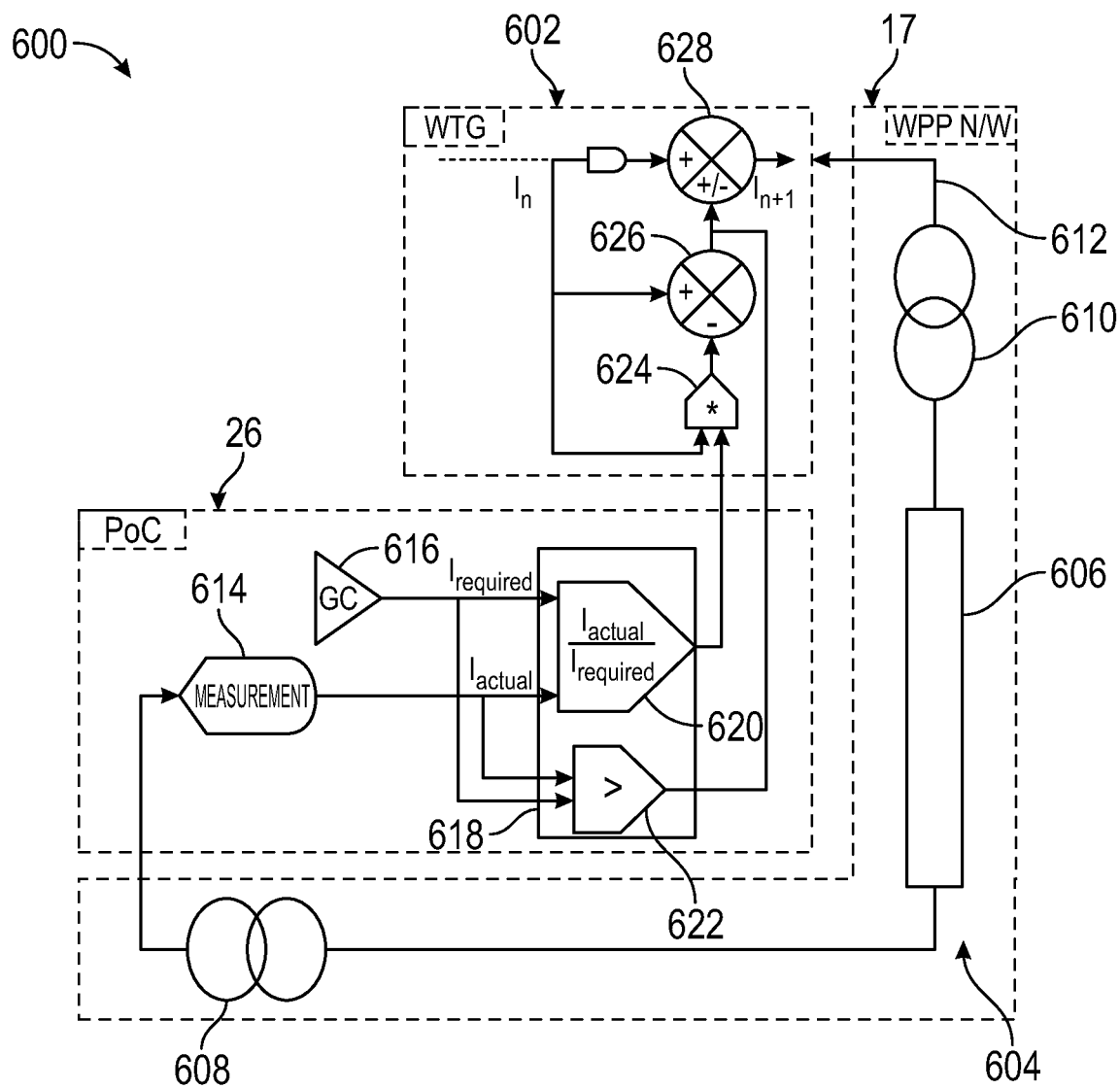
FIG. 6 is a schematic diagram of the flow of information within a power network according to the process of FIG. 4.

The process of FIGS. 4 and 5 are illustrated with reference to a power network 600 in FIG. 6. The schematic diagram of FIG. 6 illustrates a power network 600 incorporating a WTG 14 comprising a WTG controller 602, the PoC 26 and the collector network 17 that extends between the WTG 14 and the PoC 26.

As shown, the collector network 17 incorporates components 604 having impedances, such as cables 606, substation transformers 608 or power plant transformers 610, for example. A current output 612 from the WTG 12 travels via the collector network 17 to the PoC 26, where a measurement 614 is made resulting in a value for an actual current level, $I_{actual}$. At the PoC 26, the grid code requirements 616 provide the required current level, $I_{required}$, to the comparator 618. In this embodiment, the comparator 618 prepares both the ratio 620 from step 502 of FIG. 5 and the analysis 622 of whether the measured, actual current level, $I_{actual}$, is less than the required current level, $I_{required}$, as found in step 508 of FIG. 5.

These values 620, 622 are passed from the PoC 26 to the WTG controller 602, where, according to steps 504, 506 and 510 to 516 of the method 500 of FIG. 5, calculations 624, 626, 628 for the product of the ratio and current set point, the difference between the product and current set point and the new WTG current set point, $I_{n+1}$, are calculated using the outputs 620, 622 of the comparator 618 and the input previous WTG current set point, $I_n$.

The WTG controller 602 outputs the new, altered set point, and controls the WTG 14 to output current according to the altered set point $I_{n+1}$. The process 600 then repeats with a new measurement 614 at the PoC 26.

Figure 7:
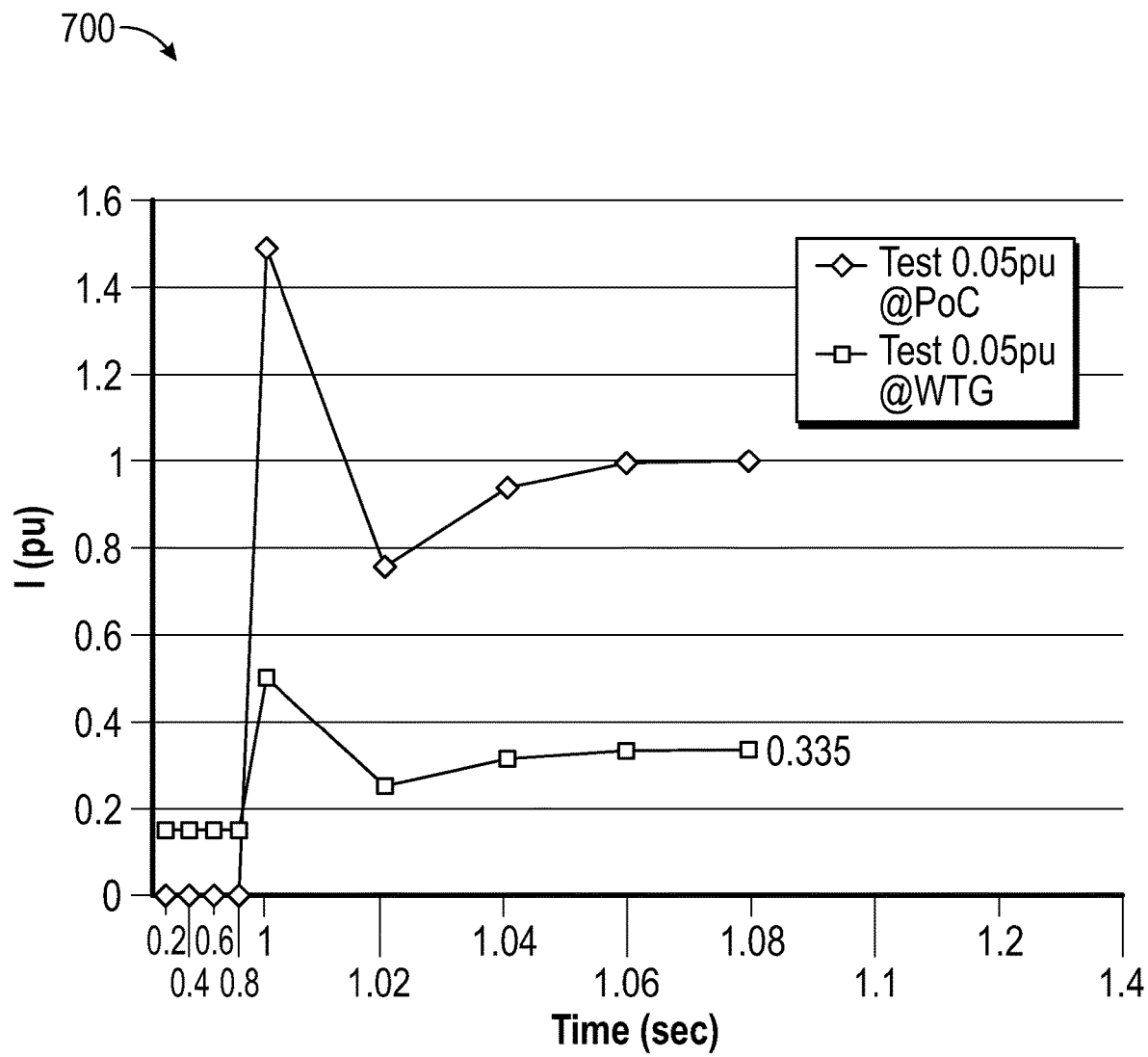
FIG. 7 is a chart outlining an example case in which active currents at the Point of Interconnection and wind turbine generator are altered according to the process of FIG. 4.
Figure 8:
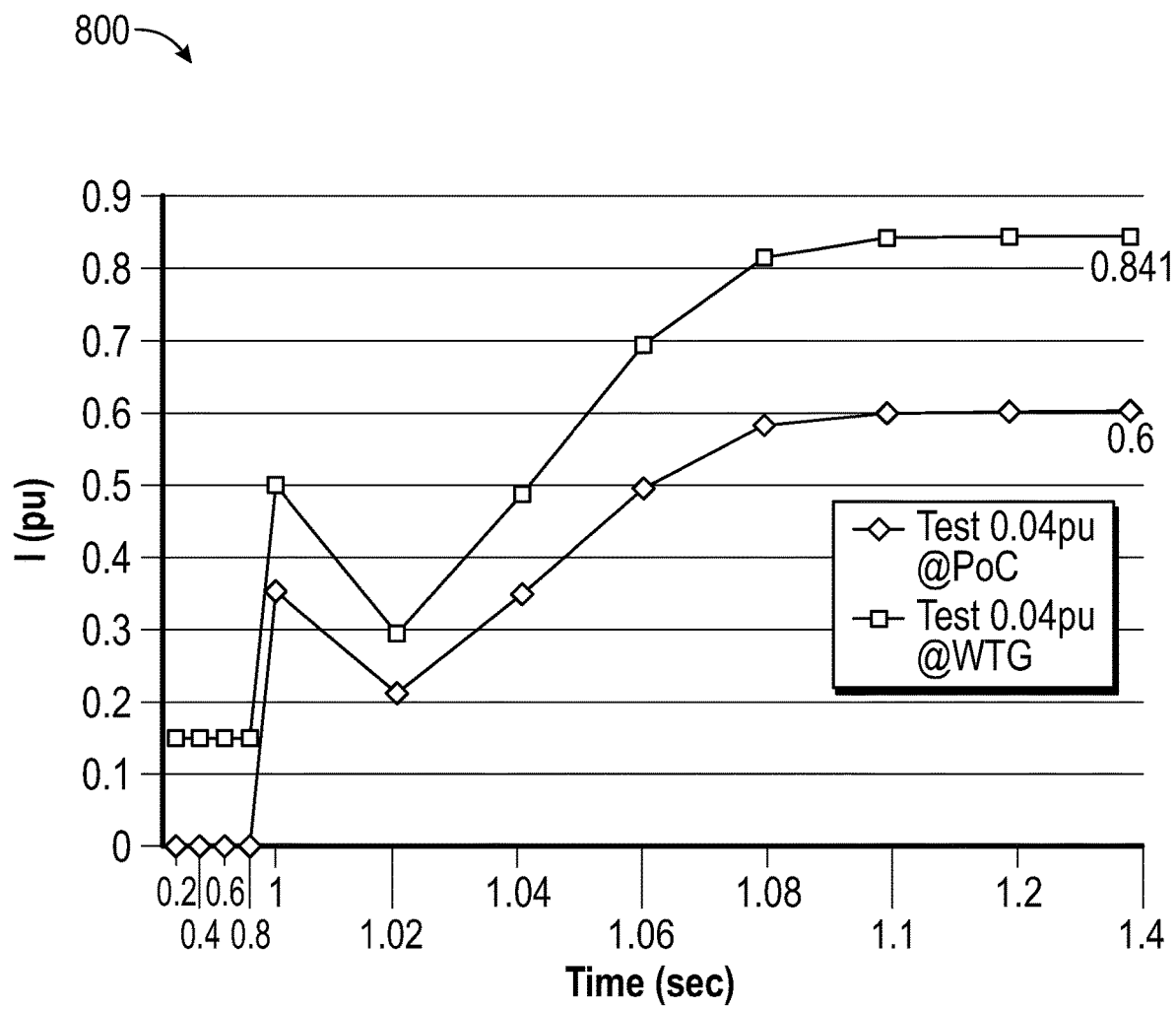
FIG. 8 is a chart outlining an example case in which reactive currents at the Point of Interconnection and wind turbine generator are altered according to the process of FIG. 4.

FIGS. 7 and 8 illustrate test examples 700, 800 illustrating implementations of the methods 400, 500 of FIGS. 4 and 5 for active current and reactive current respectively.

FIG. 7 shows an example implementation 700 of the methods 400, 500 of FIGS. 4 and 5 for active current correction at a voltage level of 0.05 p.u. As can be seen from FIG. 2, the required active current level for 0.05 p.u. voltage is 1 p.u. active current. So, $I_{required}=1$.

In FIG. 7, the control method 400 of FIG. 4 is first implemented after 1 second, and in accordance with the first step 402 of FIG. 4, begins with the WTG 14 being controlled at a nominal set point, $I_n$, of 0.5 p.u. This results in an actual current level measured at the PoI 26 of 1.493 p.u, according to the second step 406 of the method 400 of FIG. 4. The required active current level has been determined 408, as described above, as being 1 p.u. active current for a voltage level of 0.05 p.u. voltage. Therefore, for the first iteration, $I_{actual}=1.493$, and so the ratio, r, of measured active current level to required active current level, as calculated using the first step 502 of the method 500 shown in FIG. 5, is 1.493 as:

$$r = 1.493/1 = 1.493. \quad (1)$$

According to the second step 504 of the method 500 of FIG. 5, the product, p, is calculated as 0.746 as:

$$p = 1.493 * 0.5 = 0.746. \quad (2)$$

According to the third step 506 of the method 500 of FIG. 5, the difference, d, is calculated as 0.246 as:

$$d = 0.746 - 0.5 = 0.246. \quad (3)$$

At the fourth step 508 of the method 500 of FIG. 5, it is determined that the measured current level is greater than 514 the required current level:

$$I_{actual} \not< I_{required} \text{ as } 1.49 > 1. \quad (4)$$

So, at the final step 516 of the method 500 of FIG. 5, the new current set point, $I_{n+1}$, is calculated and set as being the magnitude of the difference between the difference, d, and the set point, $I_n$. Therefore, the new current set point is 0.254 as:

$$I_{n+1} = |I_n - d| = |0.5 - 0.246| = 0.254| = 0.254. \quad (5)$$

As can be seen from the chart 700 of FIG. 7, the time elapsed between the process controlling the WTG 14 at the first set point of 0.5 p.u. active current and the calculations the methods 400, 500 of FIGS. 4 and 5 being carried out is 0.02 seconds. At the second measurement point, the WTG set point, $I_n$, is set as 0.254 p.u. active current. This results in a measured active current level at the PoI 26 of 0.757 p.u. active current.

Again following the steps of the methods 400, 500 of FIGS. 4 and 5, the new set point, $I_{n+1}$, is calculated to be 0.315 p.u. active current. The calculations performed are as follows:

$$r = 0.757/1 = 0.757 \quad (1)$$

$$p = 0.757 * 0.254 = 0.192 \quad (2)$$

$$d = 0.192 - 0.254 = -0.062. \quad (3)$$

$$I_{actual} < I_{required} \text{ as } 0.757 < 1 \quad (4)$$

$$I_{n+1} = |d - I_n| = |-0.062 - 0.254| = |-0.315| = 0.315. \quad (5)$$

The calculation of each set point approaching the correct value of 0.335 p.u. active current can be followed through in a similar fashion. Each iteration is outlined in Table 1 below, including the two iterations already worked through above. $I_{required} = 1$ for all iterations.

TABLE 1

| Iteration No. | 1 | 2 | 3 | 4 | 5 |
|---|---|---|---|---|---|
| $I_n$ | 0.5 | 0.254 | 0.315 | 0.334 | 0.335 |
| $I_{actual}$ | 1.493 | 0.757 | 0.941 | 0.997 | 1 |
| (1) r | 1.493 | 0.757 | 0.941 | 0.997 | — |
| (2) p | 0.746 | 0.192 | 0.297 | 0.333 | — |
| (3) d | 0.246 | −0.062 | −0.019 | −0.001 | — |
| (4) $I_{actual} < I_{required}$ | No | Yes | Yes | Yes | — |
| (5) $I_{n+1}$ | 0.254 | 0.315 | 0.334 | 0.335 | — |

As can be seen from Table 1, within 4 iterations the set point output to the WTG 14 has been refined such that the measured actual active current level at the PoI 26 is equal to the required active current level specified by the grid requirements.

From the chart 700 of FIG. 7, it can also be seen that the time taken to perform 4 iterations and to achieve an active current level at the PoI 26 that is the same as the required active current level is 0.08 seconds.

FIG. 8 illustrates a similar iterative test process 800 for determining a reactive current set point for a PoI voltage level of 0.4 p.u. It can be seen that correct PoI reactive current output level, according to the chart 300 of FIG. 3, is achieved carrying out the method 400 of the invention according to FIG. 4 within 0.1 seconds and 5 iterations.

Many modifications may be made to the above examples without departing from the scope of the present invention as defined in the accompanying claims.

The invention claimed is:

1. A renewable energy power plant comprising a plurality of renewable energy generators and a control system for controlling a power output of the plurality of renewable energy generators, a power network connecting those renewable energy generators to a Point of Interconnection (PoI) with which the power network is connected to an external power grid, and measurement means configured to measure electrical parameters associated with the PoI, wherein the control system is configured to:
   operate each renewable energy generator to achieve a respective current level at a terminal of the renewable energy generator that is equal to a current set point; and
   implement, during a grid fault event, a feedback control routine in which the control system:
      determines a measured value of an electrical parameter at the PoI;
      determines a target value of the electrical parameter; and
      adjusts the current set point by a difference between (i) the current set point and (ii) a product of the current set point and a ratio of the measured value and the target value.

2. The renewable energy power plant of claim 1, wherein, during the grid fault event, the control system operates each renewable energy generator to achieve a respective current level at a terminal of the renewable energy generator that is equal to the adjusted current set point.

3. The renewable energy power plant of claim 2, wherein, during the grid fault event, the control system determines whether the measured value of the electrical parameter is substantially equal to the target value of the electrical parameter, and, if it is determined that the measured value of the electrical parameter is not substantially equal to the target value of the electrical parameter, repeats the feedback control routine.

4. The renewable energy power plant of claim 3, wherein the control system repeats the feedback control routine until the measured value of the electrical parameter is equal to the target value of the electrical parameter.

5. The renewable energy power plant of claim 1, wherein the control system comprises a plurality of renewable energy generator controllers, each one of the renewable energy generator controllers being associated with a respective renewable energy generator or group of renewable energy generators.

6. The renewable energy power plant of claim 5, wherein each one of the renewable energy generator controllers is configured to modify the current set point for its respective renewable energy generator or generators.

7. The renewable energy power plant of claim 1, wherein the control system adjusts the current set point further based on a directional component that indicates a direction in which the product should be applied.

8. The renewable energy power plant of claim 1, wherein the electrical parameter is active current output level or reactive current output level.

9. The renewable energy power plant of claim 1, wherein, during the grid fault event, the control system determines a voltage level of the external power grid and determines the target value of the electrical parameter based on the determined voltage level.

10. A method of controlling power output of a plurality of renewable energy generators in a renewable energy power plant having a power network connecting the plurality of renewable energy generators to a Point of Interconnection (PoI) connected to an external power grid; wherein the method comprises:
- operating each renewable energy generator to achieve a respective current level at a terminal of the renewable energy generator that is equal to a current set point; and
- implementing, during a grid fault event, a feedback control routine, comprising:
  - determining a measured value of an electrical parameter at the PoI;
  - determining a target value of the electrical parameter; and
  - adjusting the current set point by a difference between (i) the current set point and (ii) a product of the current set point and a ratio of the measured value and the target value.

11. The method of claim 10, wherein adjusting the current set point is further based on a directional component that indicates a direction in which the product should be applied.

* * * * *